(12) United States Patent
Lee et al.

(10) Patent No.: US 9,503,319 B2
(45) Date of Patent: Nov. 22, 2016

(54) METHOD AND APPARATUS FOR TRANSMITTING CONFIGURATION IN WIRELESS COMMUNICATION SYSTEM

(71) Applicant: LG ELECTRONICS INC., Seoul (KR)

(72) Inventors: Youngdae Lee, Anyang-si (KR); Sungjun Park, Anyang-si (KR); Seungjune Yi, Anyang-si (KR); Sunghoon Jung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 123 days.

(21) Appl. No.: 14/390,938

(22) PCT Filed: Apr. 12, 2013

(86) PCT No.: PCT/KR2013/003094
§ 371 (c)(1),
(2) Date: Oct. 6, 2014

(87) PCT Pub. No.: WO2013/154387
PCT Pub. Date: Oct. 17, 2013

(65) Prior Publication Data
US 2015/0055448 A1 Feb. 26, 2015

Related U.S. Application Data

(60) Provisional application No. 61/623,529, filed on Apr. 12, 2012.

(51) Int. Cl.
| | | |
|---|---|---|
| *H04L 12/24* | (2006.01) | |
| *H04B 7/26* | (2006.01) | |
| *H04L 1/00* | (2006.01) | |
| *H04W 76/02* | (2009.01) | |
| *H04W 36/08* | (2009.01) | |
| *H04W 76/04* | (2009.01) | |

(52) U.S. Cl.
CPC ............. *H04L 41/0672* (2013.01); *H04B 7/26* (2013.01); *H04L 1/00* (2013.01); *H04L 41/0816* (2013.01); *H04W 36/08* (2013.01); *H04W 76/027* (2013.01); *H04W 76/028* (2013.01); *H04W 76/048* (2013.01)

(58) Field of Classification Search
None
See application file for complete search history.

(56) References Cited

U.S. PATENT DOCUMENTS

| | | | |
|---|---|---|---|
| 2007/0293224 A1 | 12/2007 | Wang et al. | |
| 2008/0008212 A1 | 1/2008 | Wang et al. | |
| 2012/0015657 A1* | 1/2012 | Comsa | H04W 36/0094 455/436 |
| 2012/0039365 A1 | 2/2012 | Suzuki et al. | |
| 2012/0196645 A1* | 8/2012 | Kim | H04W 52/36 455/524 |

FOREIGN PATENT DOCUMENTS

| | | |
|---|---|---|
| WO | 2010/151089 A2 | 12/2010 |
| WO | 2011/127018 A1 | 10/2011 |

* cited by examiner

*Primary Examiner* — Brian Roberts
(74) *Attorney, Agent, or Firm* — Dentons US LLP

(57) ABSTRACT

A method and apparatus for transmitting a configuration in a wireless communication system is provided. A user equipment (UE) receives a configuration from a first node, stores the received configuration if a connection failure is detected, and transmits the stored configuration to a second node. The connection failure may be one of a radio link failure (RLF) or a handover failure (HOF). The configuration may include at least one of a discontinuous reception (DRX) configuration and a measurement configuration.

12 Claims, 10 Drawing Sheets

METHOD AND APPARATUS FOR TRANSMITTING CONFIGURATION IN WIRELESS COMMUNICATION SYSTEM

This application is a National Stage Application of International Patent Application No. PCT/KR2013/003094, filed on Apr. 12, 2013, and claims the benefit of U.S. Provisional Application No. 61/623,529, filed on Apr. 12, 2012, in the United States Patent and Trademark Office, all of which are incorporated herein by reference in their entirety.

BACKGROUND OF THE INVENTION

1. Field of the Invention

The present invention relates to wireless communications, and more particularly, to a method and apparatus for transmitting a configuration in a wireless communication system.

2. Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

During a connection procedure, a radio link failure (RLF) or a handover failure (HOF) may occur. Occurrence of the radio link failure or the handover failure has dependency on configurations that a user equipment (UE) uses to communicate with an eNodeB (eNB), such as a discontinuous reception (DRX) configuration or a measurement configuration. For instance, if a DRX length is set to a large vale in the DRX configuration, a handover failure rate would increase in some cases. Or, if a time-to-trigger is set to a large value in the measurement configuration, a handover failure rate would increase in some cases.

Accordingly, there is need to prevent occurrence of a radio link failure or a handover failure using a received configuration.

SUMMARY OF THE INVENTION

The present invention provides a method and apparatus for transmitting a configuration in a wireless communication system. The present invention provides a method for storing a received configuration if a connection failure is detected, and transmitting the stored configuration to a network in a wireless communication system.

In an aspect, a method for transmitting, by a user equipment, a configuration in a wireless communication system is provided. The method includes receiving a configuration from a first node, storing the received configuration if a connection failure is detected, and transmitting the stored configuration to a second node.

The connection failure may be one of a radio link failure (RLF) or a handover failure (HOF).

The configuration may include at least one of a discontinuous reception (DRX) configuration and a measurement configuration.

The method may further include applying the received configuration.

The transmitting the stored configuration may include informing to the second node that the stored configuration is available upon a connection establishment, a connection re-establishment, or a handover procedure.

The stored configuration may be transmitted upon receiving a request from the second node.

In another aspect, a user equipment (UE) in a wireless communication system is provided. The UE includes a radio frequency (RF) unit for transmitting or receiving a radio signal, and a processor coupled to the RF unit, and configured for receiving a configuration from a first node, storing the received configuration if a connection failure is detected, and transmitting the stored configuration to a second node.

A radio link failure or a handover failure may be prevented.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3$^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
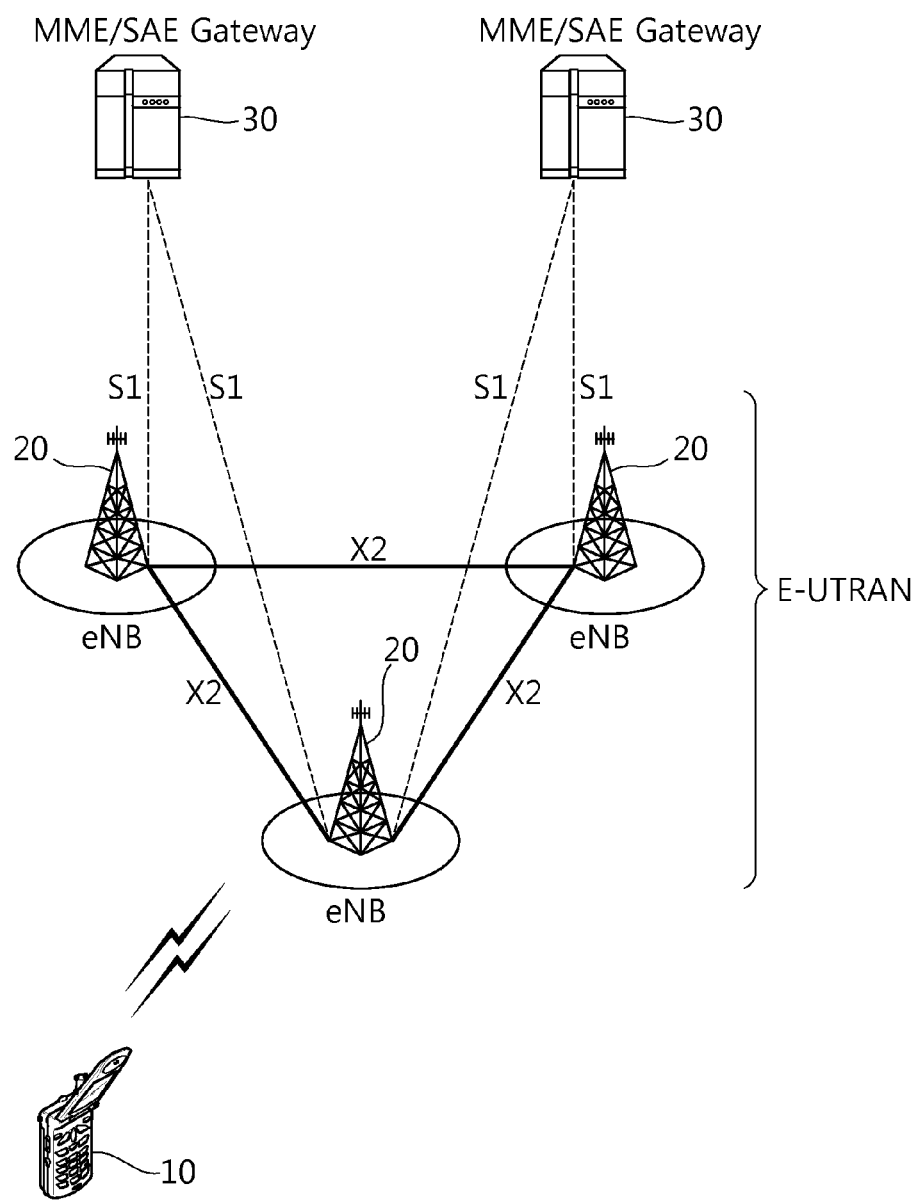
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. The EPC may consist of a mobility management entity (MME) 30, a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The BSs 20 are connected to the MME 30 by means of an S1-MME, and are connected to the S-GW by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
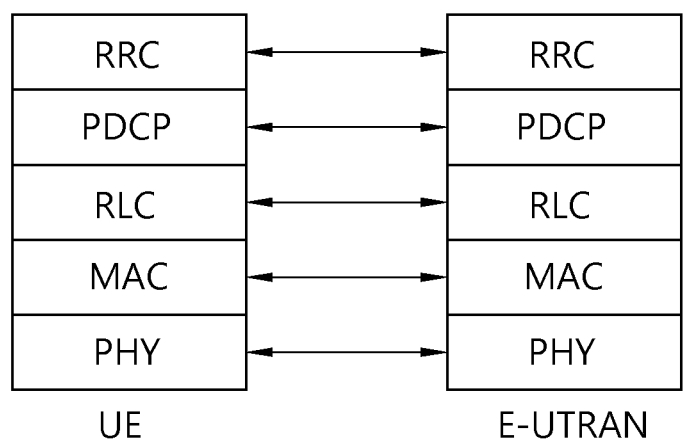
FIG. 2 is a diagram showing a radio interface protocol architecture for a control plane.
Figure 3:
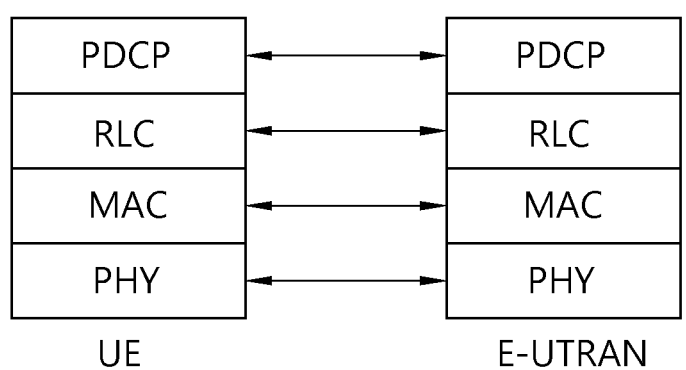
FIG. 3 is a diagram showing a radio interface protocol architecture for a user plane.

FIG. 2 is a diagram showing a radio interface protocol architecture for a control plane. FIG. 3 is a diagram showing a radio interface protocol architecture for a user plane.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a control plane which is a protocol stack for control signal transmission and a user plane which is a protocol stack for data information transmission. The layers of the radio interface protocol exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARM) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
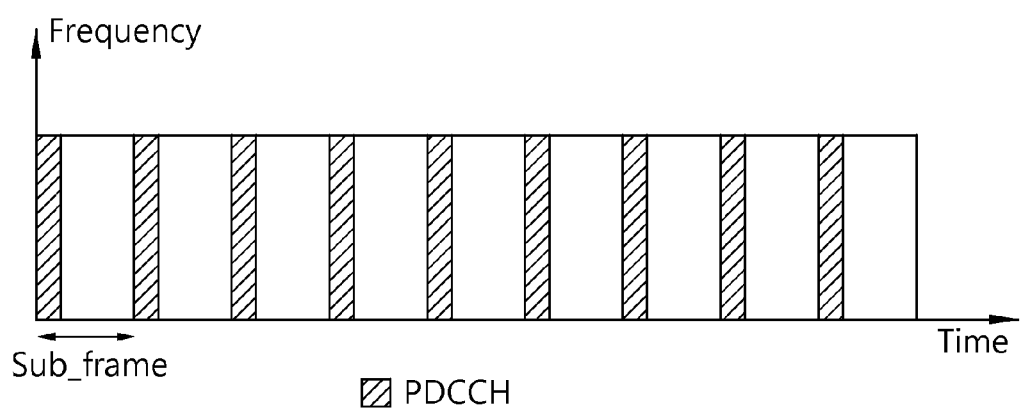
FIG. 4 shows an example of a physical channel structure.

FIG. 4 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel can be divided into a control channel for delivering control region information and a traffic channel for delivering user region information. The logical includes a broadcast control channel (BCCH), a paging control channel (PCCH), a common control channel (CCCH), a multicast control channel (MCCH), a multicast traffic channel (MTCH), etc.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

An RRC state indicates whether the RRC of the UE is logically connected to the RRC of the E-UTRAN. When an RRC connection is established between an RRC layer of the UE and an RRC layer of the network, the UE is in an RRC connected state (RRC_CONNECTED), and otherwise the UE is in an RRC idle state (RRC_IDLE). Since the UE in the RRC_CONNECTED state has the RRC connection established with the E-UTRAN, the E-UTRAN can recognize the existence of the UE in the RRC_CONNECTED and can effectively control the UE. Meanwhile, the UE in the RRC_IDLE state cannot be recognized by the E-UTRAN, and a core network (CN) manages the UE in unit of a tracking area (TA) which is a larger area than a cell. That is, only the existence of the UE in the RRC_IDLE state is recognized in unit of a large area, and the UE must transition to the RRC_CONNECTED state to receive a typical mobile communication service such as voice or data communication.

When the user initially powers on the UE, the UE first searches for a proper cell and then remains in the RRC_IDLE state in the cell. When there is a need to establish an RRC connection, the UE which remains in the RRC_IDLE state may establish the RRC connection with the RRC of the E-UTRAN through an RRC connection procedure and then may transition to the RRC_CONNECTED state. The UE which remains in the RRC_IDLE state may need to establish the RRC connection with the E-UTRAN when uplink data transmission is necessary due to a user's call attempt or the like or when there is a need to transmit a response message upon receiving a paging message from the E-UTRAN.

A non-access stratum (NAS) layer belongs to an upper layer of the RRC layer and serves to perform session management, mobility management, or the like. To manage mobility of the UE in the NAS layer, two states, i.e., an EPS mobility management (EMM)-REGISTERED state and an EMM-DEREGISTERED state, can be defined. The two states are applicable to the UE and the MME. The UE is initially in the EMM-DEREGISTERED state. To access the network, the UE may perform a process of registering to the network through an initial attach procedure. If the initial attach procedure is successfully performed, the UE and the MME may be in the EMM-REGISTERED state.

In addition, to manage a signaling connection between the UE and the EPC, two states, i.e., an EPS connection management (ECM)-IDLE state and an ECM-CONNECTED state, can be defined. The two states are applicable to the UE and the MME. When the UE in the ECM-IDLE state establishes an RRC connection with the E-UTRAN, the UE may be in the ECM-CONNECTED state. When the MME in the ECM-IDLE state establishes an S1 connection with the E-UTRAN, the MME may be in the ECM-CONNECTED state. When the UE is in the ECM-IDLE state, the E-UTRAN does not have information on the context of the UE. Therefore, the UE in the ECM-IDLE state can perform a UE-based mobility related procedure such as cell selection or cell reselection without having to receive a command of the network. If a location of the UE in the ECM-IDLE state becomes different from a location known to the network, the UE may report the location of the UE to the network through a tracking area update procedure. On the other hand, the mobility of the UE in the ECM-CONNECTED state may be managed by the command of the network.

Figure 5:
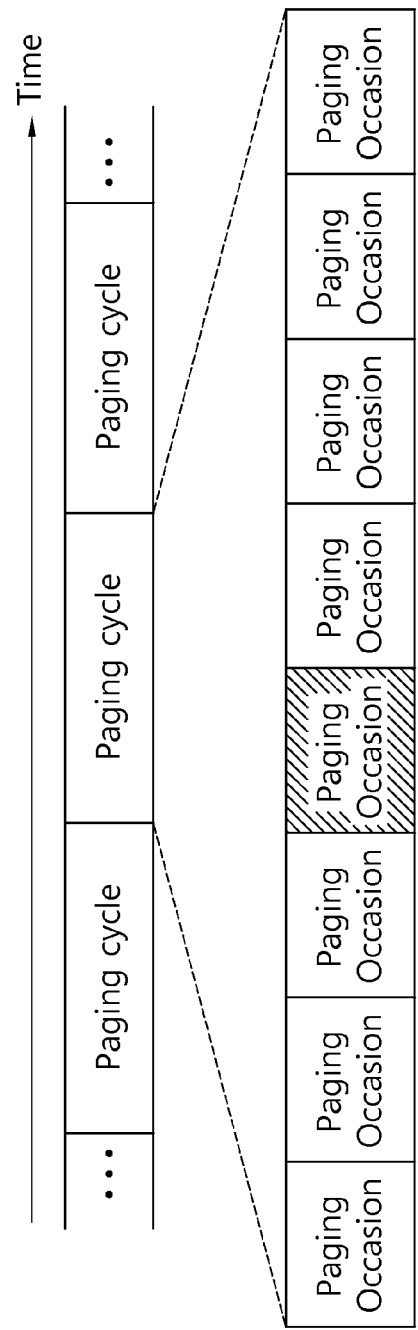
FIG. 5 shows transmission of a paging channel.

FIG. 5 shows transmission of a paging channel.

When there is data to be transmitted by a network to a specific UE or a call delivered to the specific UE, the paging message is used to search and wake up the UE. To transmit the paging message, an E-UTRAN may search for a certain location area in which the UE is currently located, and may transmit the paging message through one cell belonging to the location area in which the UE is located. For this, whenever there is a change in the location area, the UE may report the change to the network, which is called a location area update procedure.

Referring to FIG. 5, a plurality of paging cycles is configured, and one paging cycle may include a plurality of paging occasions. When receiving the paging message, the UE may perform discontinuous reception (DRX) to decrease power consumption. For this, the network may configure a plurality of paging occasions for every time period called a paging cycle, and a specific UE may receive the paging message by monitoring a paging channel only during a specific paging occasion. The UE does not monitor the paging channel in a time other than the specific paging occasion assigned to the UE. One paging occasion may correspond to one TTI.

The system information is necessary information which must be known to the UE to access the network. The UE must entirely receive the system information before the network access, and must always have the latest system information. In addition, since the system information is information which must be known to all UEs in one cell, the BS may periodically transmit the system information.

The system information may include a master information block (MIB), a scheduling block (SB), a system information block (SIB), etc. The MIB may indicate a physical configuration (e.g., a bandwidth, etc.) of a corresponding cell. The SB may indicate transmission information of SIBs, for example, a transmission period of the SIBs. The SIB is a set of related system information. For example, a certain SIB may include only information of a neighbor cell, and another SIB may include only information of an uplink radio channel used by the UE.

The BS may transmit the paging message to the UE to report whether there is a change in the system information. In this case, the paging message may include a system information change indicator. If the paging message received according to the paging cycle includes the system information change indicator, the UE may receive the system information transmitted through a BCCH which is a logical channel.

Referring to the section 5.2.1.2 of 3GPP TS 37.320 V10.4.0 (December 2011), if the UE which is RRC-connected with a serving cell detects a radio link failure (RLF) or a handover failure (HOF) during an RRC connection reestablishment procedure and thus transitions to the RRC_IDLE state, the UE may store information related to the failure, that is, RLF information. The RLF information may include a channel measurement value of a last serving cell and a channel measurement value of a neighbor cell, information of a cell in which the RLF occurs, information of a location at which the RLF occurs, whether a failure is the RLF or the handover failure, an identifier (ID) of a cell which attempts RRC connection reestablishment, an ID of a cell to which the UE is lastly successfully connected before the RLF, etc. The channel measurement value of the cell may be reference signal received power (RSRP), reference signal received quality (RSRQ), etc. In addition, if specific location information such as global navigation satellite system (GNSS) location information or the like is available, the information of the location at which the RLF occurs may include a latitude, a longitude (mandatory), an altitude (conditional on availability), a velocity (conditional on availability), a direction (conditional on availability), etc.

If the UE stores the RLF information, the UE may report availability of the RLF information to the BS through an RRC connection reestablishment message during the RRC connection reestablishment procedure. Alternatively, the UE may report the availability of the RLF information to the BS through an RRC connection reconfiguration message during an RRC connection reconfiguration procedure. In addition, if the RRC connection reconfiguration procedure fails, the UE enters the RRC_IDLE state, and thereafter the UE may transition again to the RRC_CONNECTED state by performing the RRC connection establishment procedure according to an instruction of an NAS layer. In this case, the UE may report the availability of the RLF information to the BS through an RRC connection establishment complete message during the RRC connection establishment procedure.

The availability of the RLF information may be an rlf-InfoAvailable indicator defined in 3GPP TS 36.331 V10.0.0 (December 2010). If the RLF occurs in 3GPP LTE, rlf-InfoAvailable indicator may be configured only in one LTE connection establishment message transmitted after the RLF.

When the UE reports the availability of the RLF information to the BS, the BS may request the RLF information by transmitting a UE information request message to the UE. Upon receiving the UE information request message, the UE may report the RLF information (i.e., rlf-Report) by using a UE information response message.

Figure 6:
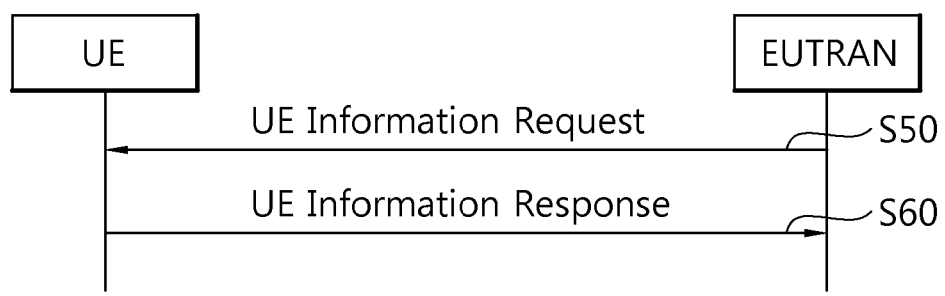
FIG. 6 shows an example of a UE information procedure that carries RLF information.

FIG. 6 shows an example of a UE information procedure that carries RLF information. It may refer to section 5.6.5 of 3GPP TS 36.331 V10.5.0 (March 2012).

The UE information procedure is used by the E-UTRAN to request the UE to report information. At step S50, the E-UTRAN transmits a UE information request message to the UE. At step S60, the UE transmits a UE information response message to the E-UTRAN.

Upon receiving the UEInformationRequest message, the UE shall:

1> if rach-ReportReq is set to true, set the contents of the rach-Report in the UEInformationResponse message as follows:

2> set the numberOfPreamblesSent to indicate the number of preambles sent by MAC for the last successfully completed random access procedure;

2> if contention resolution was not successful for at least one of the transmitted preambles for the last successfully completed random access procedure:

3> set the contentionDetected to true;

2> else:

3> set the contentionDetected to false;

1> if rlf-ReportReq is set to true and the UE has radio link failure information or handover failure information available in VarRLF-Report and plmn-Identity stored in VarRLF-Report is equal to the RPLMN, set the rlf-Report in the UEInformationResponse message to the value of rlf-Report in VarRLF-Report;

1> if the rlf-Report is included in UEInformationResponse:

2> discard the rlf-Report from VarRLF-Report upon successful delivery of the UEInformationResponse message confirmed by lower layers.

Figure 7:
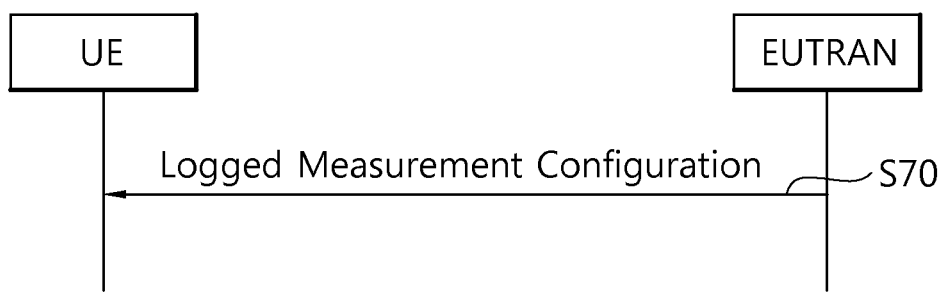
FIG. 7 shows an example of a logged measurement configuration procedure.

1> if the logMeasReportReq is present and the plmn-Identity stored in VarLogMeasReport is equal to the RPLMN:

2> if VarLogMeasReport includes one or more logged measurement entries, set the contents of the logMeasReport in the UEInformationResponse message as follows:

3> include the absoluteTimeStamp and set it to the value of absoluteTimeInfo in the VarLogMeasReport;

3> include the traceReference and set it to the value of traceReference in the VarLogMeasReport;

3> include the traceRecordingSessionRef and set it to the value of traceRecordingSessionRef in the VarLogMeasReport;

3> include the tce-Id and set it to the value of tce-Id in the VarLogMeasReport;

3> include the logMeasInfoList and set it to include one or more entries from VarLogMeasReport starting from the entries logged first;

3> if the VarLogMeasReport includes one or more additional logged measurement entries that are not included in the logMeasInfoList within the UEInformationResponse message:

4> include the logMeasAvailable;

1> if the logMeasReport is included in the UEInformationResponse:

2> submit the UEInformationResponse message to lower layers for transmission via SRB2;

2> discard the logged measurement entries included in the logMeasInfoList from VarLogMeasReport upon successful delivery of the UEInformationResponse message confirmed by lower layers;
   1> else:
   2> submit the UEInformationResponse message to lower layers for transmission via SRB1;

FIG. 7 shows an example of a logged measurement configuration procedure. It may refer to section 5.6.6 of 3GPP TS 36.331 V10.5.0 (March 2012).

The logged measurement configuration procedure is to configured the UE to perform loggin of measurement results while in RRC_IDLE. This procedure applies to logged measurements capable UEs that are in RRC_CONNECTED. At step S70, the E-UTRAN transmits a logged measurement configuration message to the UE.

E-UTRAN initiates the logged measurement configuration procedure to UE in RRC_CONNECTED by sending the LoggedMeasurementConfiguration message.

Upon receiving the LoggedMeasurementConfiguration message, the UE shall:
   1> discard the logged measurement configuration as well as the logged measurement information;
   1> store the received loggingDuration, loggingInterval and areaConfiguration, if included, in VarLogMeasConfig;
   1> store the RPLMN as plmn-Identity in VarLogMeasReport;
   1> store the received absoluteTimeInfo, traceReference, traceRecordingSessionRef and tce-Id in VarLogMeasReport;
   1> start timer T330 with the timer value set to the loggingDuration;

Upon expiry of T330, the UE shall:
   1> release VarLogMeasConfig;

The UE is allowed to discard stored logged measurements, i.e. to release VarLogMeasReport 48 hours after T330 expiry.

A logged measurement configuration release procedure is to release the logged measurement configuration as well as the logged measurement information. The UE shall initiate the procedure upon receiving a logged measurement configuration in another RAT. The UE shall also initiate the procedure upon power off or detach.

The UE shall:
   1> stop timer T330, if running;
   1> if stored, discard the logged measurement configuration as well as the logged measurement information, i.e. release the UE variables VarLogMeasConfig and VarLogMeasReport;

A measurements logging procedure specifies the logging of available measurements by a UE in RRC_IDLE that has a logged measurement configuration.

While T330 is running, the UE shall:
   1> perform the logging in accordance with the following:
   2> if the UE is camping normally on an E-UTRA cell and the RPLMN of the UE is the same as the plmn-Identity stored in VarLogMeasReport and, if the cell is part of the area indicated by areaConfiguration if configured in VarLogMeasConfig:
   3> perform the logging at regular time intervals, as defined by the loggingInterval in VarLogMeasConfig;
   2> when adding a logged measurement entry in VarLogMeasReport, include the fields in accordance with the following:
   3> set the relativeTimeStamp to indicate the elapsed time since the moment at which the logged measurement configuration was received;
   3> if detailed location information became available during the last logging interval, set the content of the locationInfo as follows:
   4> include the locationCoordinates;
   3> set the servCellIdentity to indicate global cell identity of the cell the UE is camping on;
   3> set the measResultServCell to include the quantities of the cell the UE is camping on;
   3> if available, set the measResultNeighCells, in order of decreasing ranking-criterion as used for cell re-selection, to include neighbouring cell measurements that became available during the last logging interval for at most the following number of neighbouring cells; 6 intra-frequency and 3 inter-frequency neighbours per frequency as well as 3 inter-RAT neighbours, per frequency/set of frequencies (GERAN) per RAT;
   2> when the memory reserved for the logged measurement information becomes full, stop timer T330 and perform the same actions as performed upon expiry of T330;

A method for transmitting a configuration to prevent occurrence of a radio link failure (RLF) or a handover failure is described below. According to an embodiment of the present invention, a user equipment (UE) helps a network appropriately set values in a configuration by storing a received configuration and transmitting the stored configuration to the network. That is, an embodiment of the present invention may comprise receiving a configuration related to a radio protocol from a network, applying the configuration, storing the configuration when a connection failure is detected, and informing the network about the configuration.

Figure 8:
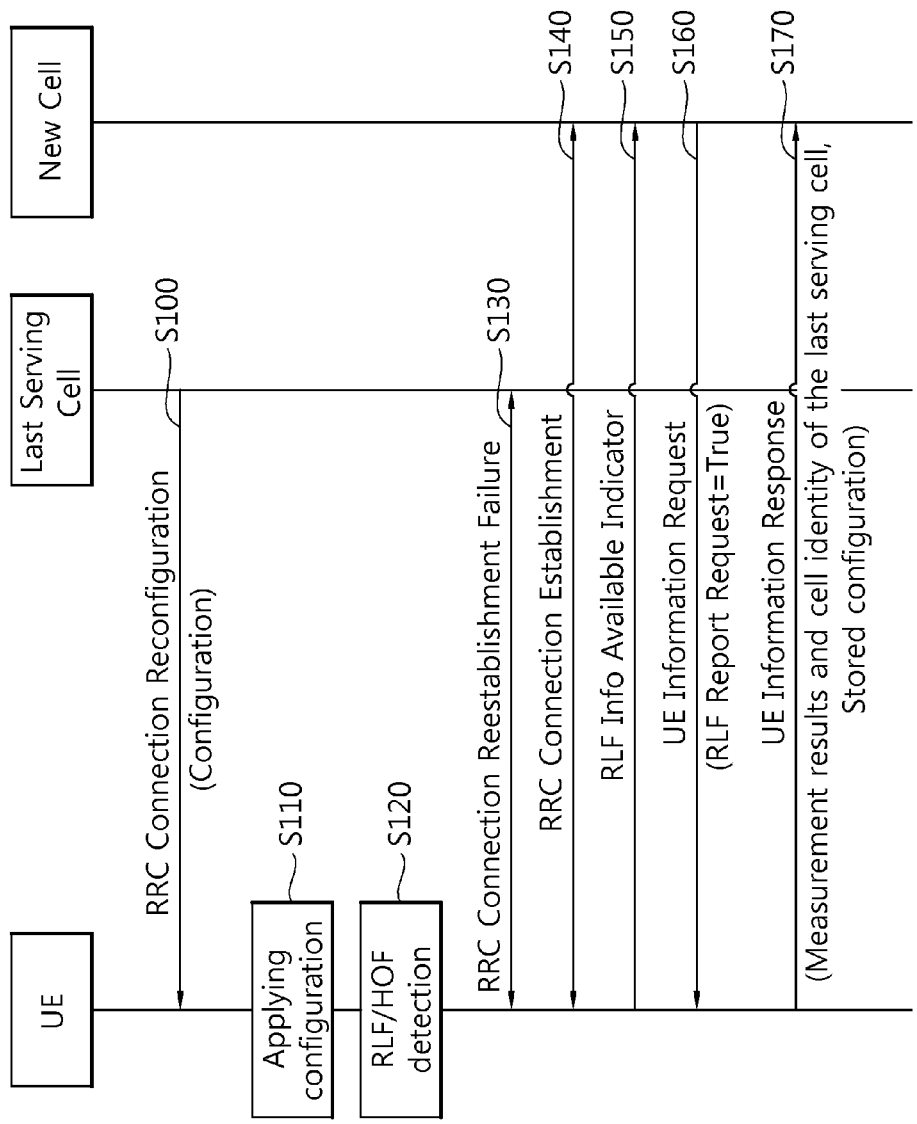
FIG. 8 shows an example of a method for transmitting a configuration according to an embodiment of the present invention.

FIG. 8 shows an example of a method for transmitting a configuration according to an embodiment of the present invention.

At step S100, while a UE is in RRC_CONNECTED, the UE receives an RRC connection reconfiguration message e.g. for a DRB configuration or a handover from the last serving cell. The RRC connection reconfiguration message may include a configuration related to a radio protocol. The configuration may correspond to one of configurations included in a message received from the last serving cell. The configuration included in the RRC connection reconfiguration message may be a measurement configuration, a mobility control information, a radio resource configuration, a security configuration, other configurations, and so on.

The measurement configuration may include a measurement object, a report configuration, a measurement identity, a quantity configuration, a measurement gap configuration, s-measure, mobile state parameters, speed state scale factors for time to trigger, and so on. The report configuration may include offsets, thresholds, hysteresis, time to trigger, a report interval, and so on.

The radio resource configuration may include a MAC configuration, a semi-persistent scheduling (SPS) configuration, a physical configuration, a RLC configuration, a logical channel configuration, a radio bearer identity, a PDCP configuration, and so on. The MAC configuration may include a discontinuous reception (DRX) configuration, a power headroom reporting (PHR) configuration, a UL-SCH configuration, and so on. The DRX configuration may include a duration timer, a DRX inactivity timer, a DRX retransmission timer, a long DRX cycle start offset, a short DRX cycle, a DRX short cycle timer, and so on.

At step S110, upon receiving the RRC connection reconfiguration message or other messages, the UE applies all of configurations included in the message.

At step S120, the UE may detect a radio link failure (RLF) or a handover failure (HOF). In this case, the UE stores the current configurations that were received through the RRC connection reconfiguration message and RLF information such as measurement results at the last serving cell and cell identity of the last serving cell. The UE may try to recover the RRC connection by initiating an RRC connection reestablishment procedure.

At step S130, if the RRC connection reestablishment procedure fails between the UE and the last serving cell, the UE enters RRC_IDLE. While the UE is in RRC_IDLE, the UE keeps storing the configurations which were applied in the last serving cell or which were received through the last received RRC message such as the RRC connection reconfiguration message.

At step S140, a NAS layer of the UE may initiate a NAS recovery by initiating an RRC connection establishment procedure between the UE and a new cell. Upon request from the NAS layer, an RRC layer of the UE performs the RRC connection establishment procedure.

At step S150, if there is stored RLF information or configurations, the UE informs the new cell that there is available RLF information or configurations. The UE may inform the new cell that the stored configurations are available upon an RRC connection establishment, an RRC connection reestablishment, or a handover procedure. In addition, the stored configurations may be informed to the new cell upon reception of a request from the new cell.

At step S160, if the UE informs the new cell that there is available RLF information or configurations, the new cell tries to retrieve the stored RLF information or configurations by transmitting a UE information request message to the UE.

At step S170, upon receiving the UE information request message, the UE transmits a UE information response message which includes the stored configurations and RLF information to the new cell. After transmitting the UE information response message, the UE may delete the stored configurations and RLF information. The stored configurations may include a measurement configuration, a mobility control information, a radio resource configuration, a security configuration, other configurations, and so on.

Figure 9:
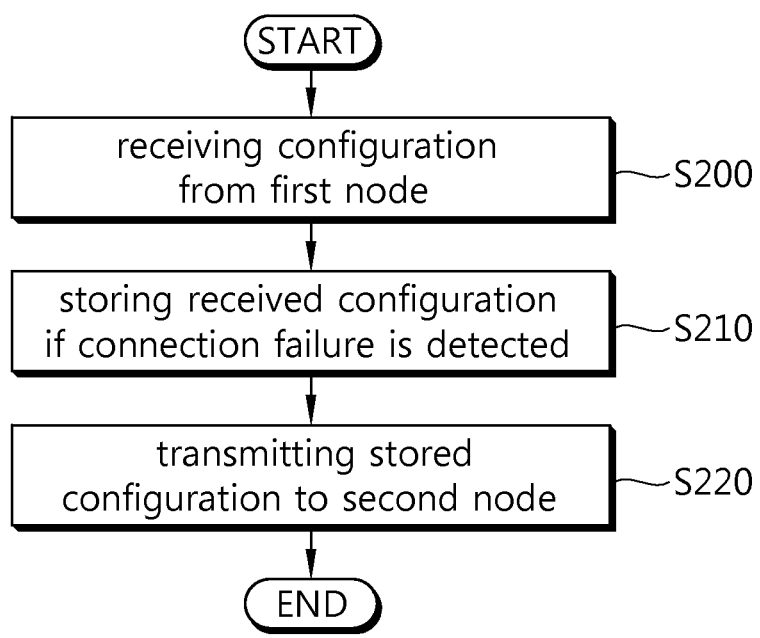
FIG. 9 shows another example of a method for transmitting a configuration according to an embodiment of the present invention.

FIG. 9 shows another example of a method for transmitting a configuration according to an embodiment of the present invention.

At step S200, the UE receives a configuration from a first node. The configuration may be a measurement configuration, a mobility control information, a radio resource configuration, a security configuration, other configurations, and so on. The radio resource configuration may be a DRX configuration.

At step S210, the UE stores the received configuration if a connection failure is detected. The connection failure may be one of a radio link failure or a handover failure.

At step S220, the UE transmits the stored configuration to a second node.

Figure 10:
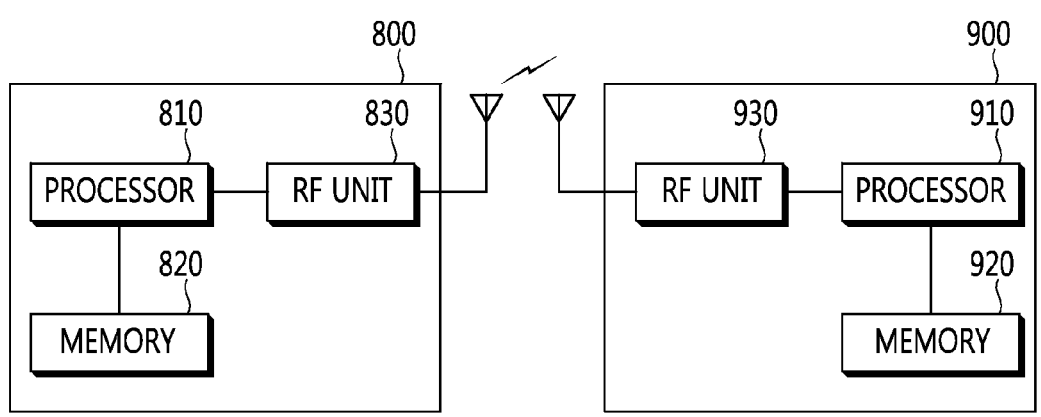
FIG. 10 is a block diagram showing wireless communication system to implement an embodiment of the present invention.

FIG. 10 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF unit 830, the first module 930, and the second module 940 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting, by a user equipment, a configuration in a wireless communication system, the method comprising:
receiving a configuration from a first node;
storing the received configuration when a connection failure is detected;
transmitting an indicator to a second node after storing the received configuration;
receiving a request message in response to the indicator from the second node;
transmitting the stored configuration in response to the request message to the second node,
wherein the indicator informs the second node that the stored configuration is available upon a connection establishment, a connection re-establishment, or a handover procedure.

2. The method of claim 1, wherein the connection failure is one of a radio link failure (RLF) or a handover failure (HOF).

3. The method of claim 1, wherein the configuration includes at least one of a discontinuous reception (DRX) configuration and a measurement configuration.

4. The method of claim 1, wherein the configuration includes at least one of a media access control (MAC) configuration, a radio bearer configuration, a radio link control (RLC) configuration, a packet data convergence protocol (PDCP) configuration, a physical channel configuration, a logical channel configuration, or a transport channel configuration.

5. The method of claim 1, further comprising applying the received configuration.

6. The method of claim 1, wherein the configuration corresponds to one of configurations included in a message received from the first node.

7. The method of claim 1, wherein the first node and the second node are the same.

8. The method of claim 1, wherein the first node and the second node are different.

9. A user equipment (UE) in a wireless communication system, the UE comprising:
   a radio frequency (RF) unit that transmits or receives a radio signal; and
   a processor, coupled to the RF unit, that:
   controls the RF unit to receive a configuration from a first node;
   stores the received configuration if a connection failure is detected;
   controls the RF unit to transmit an indicator to a second node after storing the received configuration;
   controls the RF unit to receive a request message in response to the indicator from the second node;
   controls the RF unit to transmit the stored configuration in response to the request message to the second node,
   wherein the indicator informs the second node that the stored configuration is available upon a connection establishment, a connection re-establishment, or a handover procedure.

10. The UE of claim 9, wherein the connection failure is one of a radio link failure (RLF) or a handover failure (HOF).

11. The UE of claim 9, wherein the configuration includes at least one of a discontinuous reception (DRX) configuration and a measurement configuration.

12. The UE of claim 9, wherein the processor is further configured for applying the received configuration.

* * * * *